(No Model.)

J. TIMMS.
BRAKE SHOE.

No. 275,547. Patented Apr. 10, 1883.

WITNESSES
Wm A. Skinkle
D. P. Cone

INVENTOR
James Timms
By his Attorneys
Baldwin, Hopkins & Peyton

UNITED STATES PATENT OFFICE.

JAMES TIMMS, OF COLUMBUS, OHIO.

BRAKE-SHOE.

SPECIFICATION forming part of Letters Patent No. 275,547, dated April 10, 1883.

Application filed February 19, 1883. (No model.)

*To all whom it may concern:*

Be it known that I, JAMES TIMMS, of Columbus, in the county of Franklin and State of Ohio, have invented certain new and useful Improvements in the Manufacture of Brake-Shoes for the Wheels of Railway-Cars, of which the following is a specification.

Heretofore brake shoes have been made consisting of a suitable cast brake-head and a suitable bearing-piece or brake-shoe proper. Such bearings have usually been made of cast-metal. A device of this kind is illustrated in United States Patent No. 71,591, granted December 3, 1867, and in the reissue thereof, No. 4,466, granted July 11, 1871. The difficulty with this class of brake-shoes is that the cast metal shoes or bearings rapidly wear out and have to be often replaced. This difficulty has been sought to be overcome heretofore by the employment of wrought-metal shoes or bearings upon the brake-heads. These wrought-metal shoes or bearings have, however, been so constructed and applied heretofore as not to be as economical as is desirable.

The object of my invention is to produce a simple and cheap brake-shoe provided with a wrought-metal bearing, which can be rapidly made by very simple manipulation in large numbers and at trifling cost. Accordingly, my plan is to so form the brake-heads and to so form the wrought-metal brake-shoes that they may be connected together by the use of a single pin, upon the same general principle as that indicated in the patents above mentioned, but in a manner, owing to their peculiarity and adaptability to each other, that will admit of making the brake-shoes proper by merely stamping and bending suitable blanks to be cut in sections from an ordinary wrought-metal bar, which can be rolled or otherwise forged of suitable dimensions in great lengths.

Figure 1:
Figure 2:
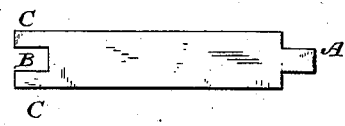
Figure 3:
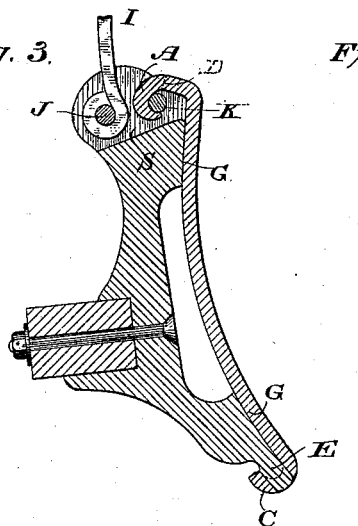
Figure 4:
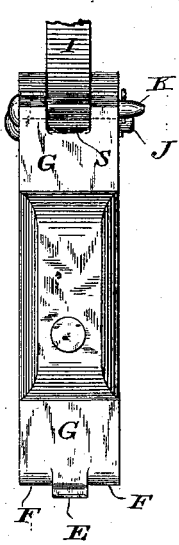
Figure 5:
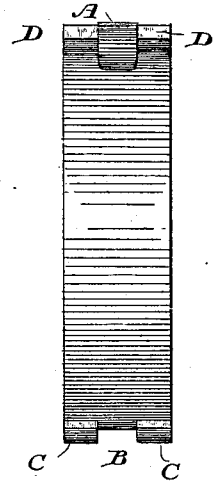
Figure 6:
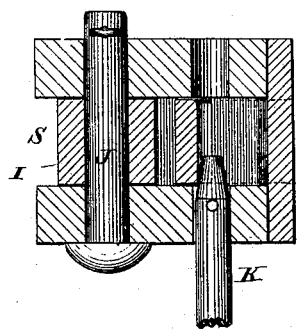
Figure 8:
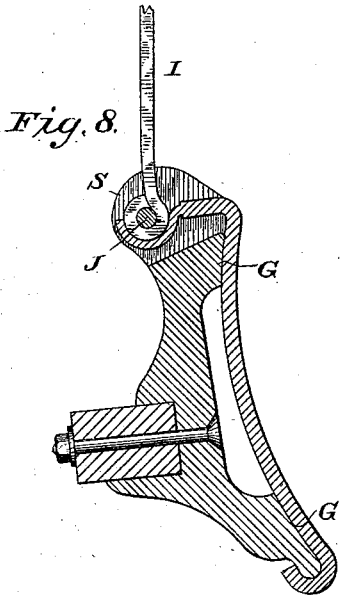
Figure 7:
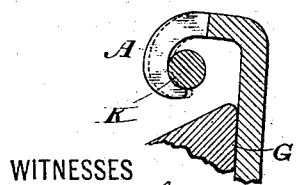

In the accompanying drawings, Figure 1 illustrates a suitable rectangular wrought-metal bar adapted to be cut, as indicated by the dotted lines, into blanks of suitable lengths for forming my improved wrought-metal brake-shoes. Fig. 2 illustrates one of these blanks formed from one of the sections of the wrought-metal bar by stamping or cutting it off with suitable dies. Fig. 3 is a central longitudinal section of the brake head and shoe proper. Fig. 4 is an elevation showing the face of the brake-head. Fig. 5 is an elevation showing the back of the brake-shoe proper. Fig. 6 is a section through the upper end of the brake-head, showing the pins. Fig. 7 is a sectional view, showing the upper end of the brake-shoe; and Fig. 8 is a longitudinal sectional view, showing a modified form of my invention.

From Fig. 2 and the dotted lines in Fig. 1 it will be observed that the blanks are cut from the bar without waste of metal, as the projection or tongue A upon one end of the shoe, when being cut, leaves a suitable recess, B, between the claws or fingers C of the opposite end of the cast shoe. The dies for cutting these shoe-blanks from the bar will obviously be formed of the shape of the cut to be made, as indicated by the dotted lines in Fig. 1. The bend of the body of the shoe may be made by hand, or more rapidly and economically by machinery which I have devised for the purpose, and the bends upon the opposite ends of the shoe for forming the fingers C, the hook A, and the shoulders D may also be made by hand, or more profitably and economically by machinery which I have devised for the purpose, and which is not here illustrated or claimed.

The brake head is formed to admit of convenient and secure attachment of the shoe when constructed and shaped as I have described, and has to accommodate itself to the brake-shoe, because the great point to be secured is economy in the construction and security in the application to a brake-head of such a wrought-metal shoe as I have described. Accordingly, I provide a tenon or projection, E, upon the lower end of the brake-head, the formation of which leaves suitable shoulders, F F, upon either side to receive the grasp or grapple of the straddling fingers of the brake-shoe. The brake-head may also be provided with a flat bearing-face, G, upon either end, and may be cut away in the center, as illustrated, to save metal and not to make the device needlessly cumbersome. Instead of these bearing-faces, lugs or projections from the brake-head might be employed to form bearings for the back of the body of the brake-shoe. The upper end of the brake-head is provided with a slot, S, to accommodate the hook of the brake-shoe, and also a hanger, I, which suspends the brake-head from the frame of the car by means of a pivot-pin, J. The pin K, passing through the brake-head underneath the hook, serves to fasten the brake-shoe securely to the brake-head after the fingers have been grappled over the lower end of the head. I prefer to make this pin K tapered at the point, as shown, so as to serve to draw the brake-shoe tightly to place upon the brake-head.

From the foregoing it will be seen that I can construct my improved brake-shoe with great rapidity and economy of wrought metal by simply cutting the blanks from the bar and then bending them without any other forging or shaping. On account of the peculiar form of the wrought-metal shoe and the brake-head adapted to receive it I can apply it with great convenience and security to the head.

The modified form of wrought-metal brake-shoe proper illustrated in Fig. 8 shows the lower end of the shoe simply bent without having any fingers; but it is much better to provide fingers and a tenon upon the brake-head to pass between them to prevent lateral displacement of the shoe upon the brake-head. In this modified form the upper end of the brake-shoe is shown with a hook or bend partially encircling the lower rounded end of the hanger, which serves to hold it in place. This form of fastening the upper end of the shoe proper upon the brake-head, however, is not the preferred form, because motion of the hanger, or of the brake-head upon the hanger in operating the brake, will wear the bent upper end of the shoe and gradually loosen it. In short, the form of brake-shoe first illustrated and described in detail is much preferable, and I have only illustrated this modification for the purpose of showing the extent of the principle of my invention, which will admit of several minor formal modifications. For example, it would be practicable to form a hole through the lower end of the brake-shoe by stamping with a suitable die at the same time that the blank is being cut from the bar, and then to form a tenon or projection on the lower end of the brake-head to pass into this hole. This form last described would also be in accordance with the improved process I have devised.

Although I have disclosed what I deem to be an improved process of manufacturing a wrought-metal brake-shoe proper, I do not claim it in this application, having reserved it for claim in another application for patent.

Having thus described the objects, construction, and advantages of my improvements in the manufacture of brake-shoes, what I claim as new, and desire to secure by Letters Patent of the United States, is—

1. An improved wrought-metal brake-shoe proper having a hook at its upper end adapted to enter a slot in the brake-head and straddling fingers at its lower end adapted to straddle and grapple the lower end of the brake-head, substantially as set forth.

2. A brake-head having a slot at its upper end and a tenon at its lower end for entering between the fingers of a brake-shoe proper, substantially as set forth.

3. The combination of a slotted and tenoned brake-head such as described and a wrought-metal brake-shoe bent at the ends and adapted to be secured to the brake-head by the use of a transverse pin, substantially as set forth.

In witness whereof I have hereunto subscribed my name this 17th day of February, A. D. 1883.

JAMES TIMMS.

Witnesses:
MARCUS S. HOPKINS,
WM. J. PEYTON.